US006439724B1

(12) United States Patent
Jeon et al.

(10) Patent No.: US 6,439,724 B1
(45) Date of Patent: Aug. 27, 2002

(54) COLOR PROJECTOR

(75) Inventors: Kee-uk Jeon, Suwon; Dae-je Chin, Seoul, both of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/586,749

(22) Filed: Jun. 5, 2000

(30) Foreign Application Priority Data

Jun. 3, 1999 (KR) .......................................... 99-20483

(51) Int. Cl.[7] ....................... G03B 21/00; G03B 21/26; G03B 21/14; G02F 1/1335; H04N 3/22
(52) U.S. Cl. ............................ 353/31; 353/34; 353/37; 353/101; 349/7; 349/58; 348/745; 348/806
(58) Field of Search .............................. 353/31, 33, 34, 353/37, 101; 349/5, 7, 58; 348/745, 806

(56) References Cited

U.S. PATENT DOCUMENTS

| 5,144,462 A | * | 9/1992 | Otsuka et al. ................. 359/41 |
| 5,696,564 A | * | 12/1997 | Hatakeyama ................ 348/756 |
| 5,861,927 A | * | 1/1999 | Suzuki et al. .................. 349/5 |
| 5,921,650 A | * | 7/1999 | Doany et al. .................. 353/31 |
| 6,010,221 A | * | 1/2000 | Maki et al. .................... 353/33 |
| 6,097,449 A | * | 8/2000 | Yamamoto et al. ............. 349/5 |
| 6,299,312 B1 | * | 10/2001 | Choi et al. .................... 353/31 |

FOREIGN PATENT DOCUMENTS

| JP | 08069062 A | 3/1996 | ........... G03B/33/12 |

* cited by examiner

Primary Examiner—Christopher Mahoney
Assistant Examiner—Magda Cruz
(74) Attorney, Agent, or Firm—Sughrue Mion, PLLC

(57) ABSTRACT

A color projector for correcting chromatism by changing the sizes or positions of three display devices with respect to each color is provided. In the color projector, two or more display devices selected from the first through third display devices have different sizes of effective areas where an image is formed such that chromatism generated while lights of different colors synthesized by the synthesizing device pass the projection lens unit can be corrected. Also, the distances between two or more display devices selected from the first through third display devices and the projection lens unit are different from one another such that chromatism generated while lights of different colors synthesized by the synthesizing device pass the projection lens unit can be corrected.

29 Claims, 11 Drawing Sheets

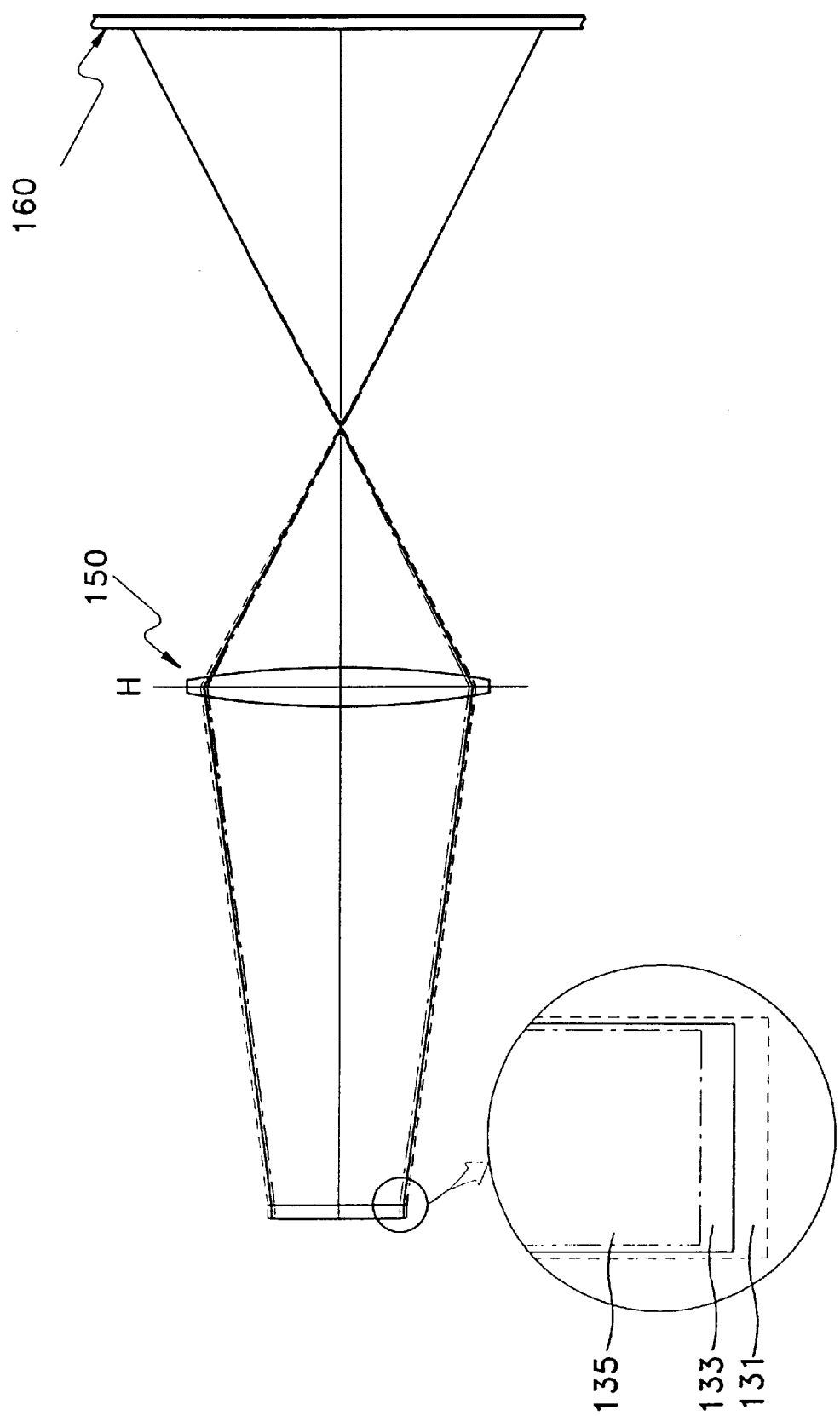

COLOR PROJECTOR

BACKGROUND OF THE INVENTION

1. Field of the Invention

The present invention relates to a color projector adopting three display devices, and more particularly, to a color projector in which the size or position of display devices with respect to each color is changed so that chromatism can be compensated for.

2. Description of the Related Art

In a typical color projector, an image formed by a display device such as an LCD panel is projected onto a screen by using an additional light source. The color projector is divided into a transmission type and a reflection type according to the type of display device.

FIG. 1 is a view showing the optical arrangement of a conventional transmission type color projector. Referring to the drawing, the conventional transmission type color projector includes a light source 10, first and second dichromatic mirrors DM1 and DM2 for splitting the light ray emitted from the light source 10 into red (R), blue (B) and green (G) colors, a plurality of total reflection mirrors M1, M2 and M3 for allowing the light rays split by the first and second dichromatic mirrors DM1 and DM2 to proceed along three different paths, first through third LCD panels 21, 23 and 25, arranged on the proceeding path of each of the split light rays, a color prism 30 for synthesizing images according to the respective colors formed by the first through third LCD panels 21, 23 and 25, and a projection lens unit 40 for projecting the synthesized color image formed while passing through the color prism 30 toward a screen 50 by magnifying the same.

Each of the first through third LCD panels 21, 23 and 25 is formed of a plurality of pixels arranged on a plane. Each pixel independently driven polarization-modulates an incident light according to input video signals and also makes light rays of a polarization component proceed toward the color prism 30. The first LCD panel 21 forms an image of an input red (R) light which is reflected by the first dichromatic mirror DM1 and passes through the second dichromatic mirror DM2; the second LCD panel 23 forms an image of an input green (G) light which is reflected by the first and second dichromatic mirrors DM1 and DM2; and the third LCD panel 25 forms an image of an input blue (B) light passing through the first dichromatic mirror DM1.

The color prism 30 has first through third incident surfaces 31, 33 and 35 disposed to face the first through third LCD panels 21, 23 and 25, respectively, and a single exhaust surface 37 facing the projection lens unit 40. The color prism 30 also has a first mirror surface 30a for reflecting the light input through the first incident surface 31 and passing the light input through the second and third incident surfaces 33 and 35, and a second mirror surface 30b for reflecting the light input though the third incident surface 35 and passing the light input through the first and second incident surfaces 31 and 33. The projection lens unit 40 projects the image, which is formed by the first through third LCD panels 21, 23 and 25, synthesized by passing through the color prism 30 and output through the exhaust surface 37, toward the screen 50 by magnifying the same.

In the conventional transmission type projector having the above structure, the first through third LCD panels 21, 23 and 25 have the same specifications. That is, the sides of the first through third LCD panels 21, 23 and 25 facing one another have the same length h. Also, the first through third LCD panels 21, 23 and 25 each are arranged to be separated the same distance from the projection lens unit 40. When the optical distances from the respective first through third incident surfaces 31, 33 and 35 of the color prism 30 to an incident surface 41a of a first lens 41 forming the projection lens unit 40 are the same, the first through third LCD panels 21, 23 and 25 are installed to be separated the same distance d from the first through third incident surfaces 31, 33 and 35, respectively.

A typical lens exhibits chromatism which is an aberration depending on the wavelength of an input light. Referring to FIG. 2, the light input parallel to a convex lens 60 is theoretically focused at a focal point f. Actually, of the input light, a red (R) light which has a relatively long wavelength focuses at a focal point $F_R$ which is a position farther than the focal point f of the convex lens 60, while a blue (B) light which has a relatively short wavelength focuses at a focal point $F_B$ which is a position closer than the focal point f of the convex lens 60.

Thus, due to the chromatism, the color images with respect to red, green and blue colors formed by the first through third LCD panels 21, 23 and 25 of FIG. 1 focus on the screen 50 at different sizes. Also, as the difference in magnification is generated with respect to red, green and blue colors, a degree of mismatch of the red, green and blue color images increases at the periphery of the screen 50, thereby deteriorating the quality of image. Therefore, as th projection lens unit 40 necessarily has an additional optical structure to compensate for the above chromatism, the structure of the projector becomes complicated.

Further, the projection lens unit 40 should be designed considering distortion and field curvature of an image formed on the screen 50. Here, the projection lens unit 40 is not able to perfectly correct both distortion and chromatism. Thus, when the projection lens unit 40 is mainly adjusted to correct the distortion that is easily noticeable to a viewer, an additional lens to correct chromatism is needed. In this case, however, it is a drawback that only a limited correction of chromatism is possible.

SUMMARY OF THE INVENTION

To solve the above problems, it is an objective of the present invention to provide a color projector which can compensate for chromatism by changing the size and/or position of a display device with respect to each color to improve image quality and also a compact design of the projection lens unit is possible.

Accordingly, to achieve the above objective, there is provided a color projector comprising a light source, a splitting device for splitting the light emitted from the light source to proceed along first through third optical paths according to the wavelength thereof, first through third display devices, arranged on the first through third optical paths, for forming an image from an input light of a predetermined wavelength, a synthesizing means for synthesizing lights of different colors to proceed along one path by selectively transmitting or reflecting input lights passing through the first through third display devices according to the wavelength thereof, and a projection lens unit for magnifying and projecting a color image synthesized by the synthesizing device toward a screen, in which two or more display devices selected from the first through third display devices have the different sizes of effective areas where an image is formed such that chromatism generated while lights of different colors synthesized by the synthesizing device pass the projection lens unit can be corrected.

Also, to achieve the above objective, there is provided a color projector comprising a light source, a splitting device for splitting the light emitted from the light source to proceed along first through third optical paths according to the wavelength thereof, first through third display devices, arranged on the first through third optical paths, for forming an image from an input light of a predetermined wavelength, a synthesizing means for synthesizing lights of different colors to proceed along one path by selectively transmitting or reflecting input lights passing through the first through third display devices according to the wavelength thereof, and a projection lens unit for magnifying and projecting a color image synthesized by the synthesizing device toward a screen, in which the distances between two or more display devices selected from the first through third display devices and the projection lens unit are different from one another such that chromatism generated while lights of different colors synthesized by the synthesizing device pass the projection lens unit can be corrected.

BRIEF DESCRIPTION OF THE DRAWINGS

The above objective and advantages of the present invention will become more apparent by describing in detail a preferred embodiment thereof with reference to the attached drawings in which:

FIG. 5 is a view showing the first through third display devices, being superposed in one direction, in a state in which a synthesizing device is excluded from the color projector of FIG. 3;

DETAILED DESCRIPTION OF THE INVENTION

Figure 1:
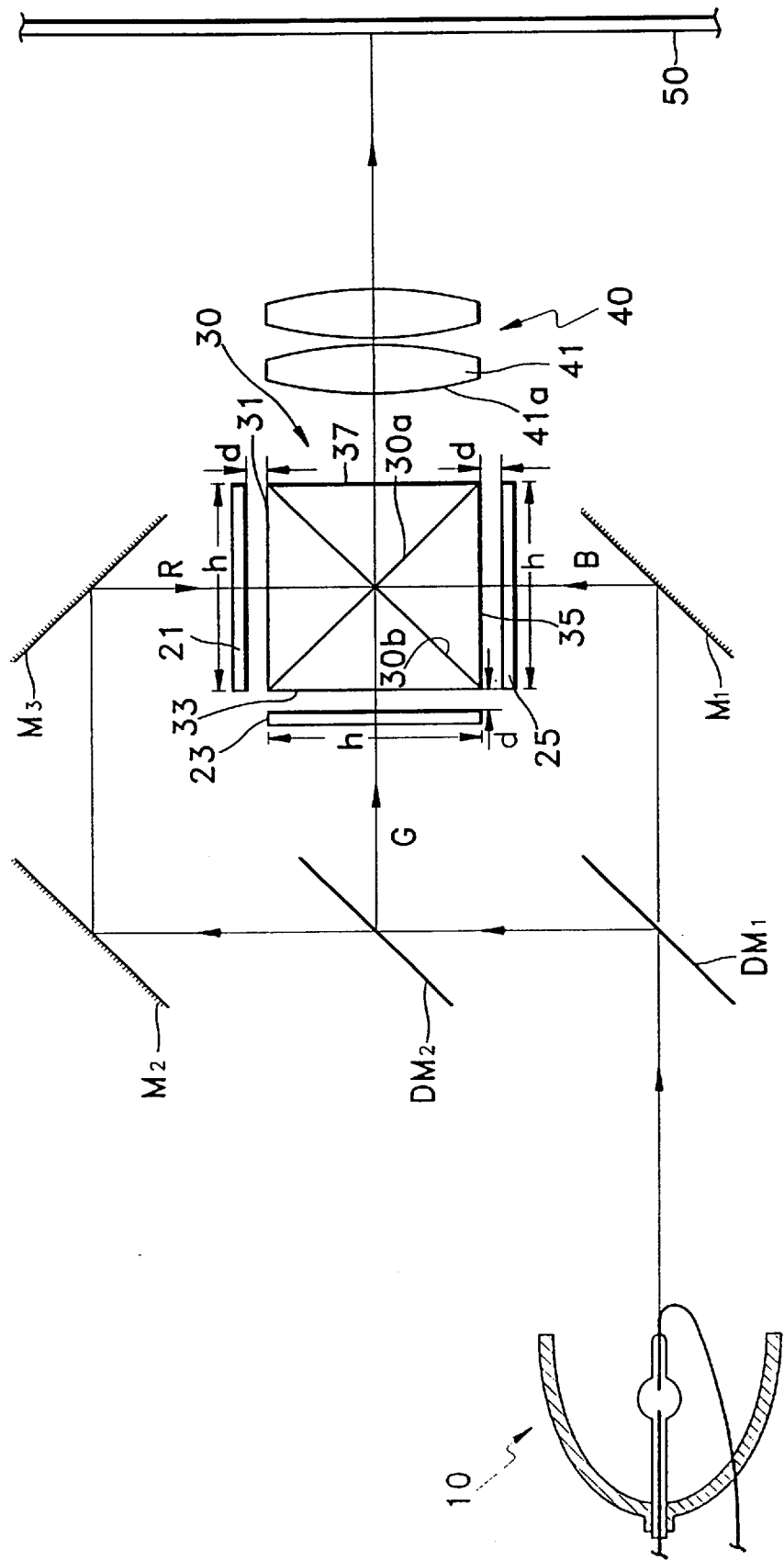
FIG. 1 is a view showing the optical arrangement of a conventional color projector.
Figure 2:
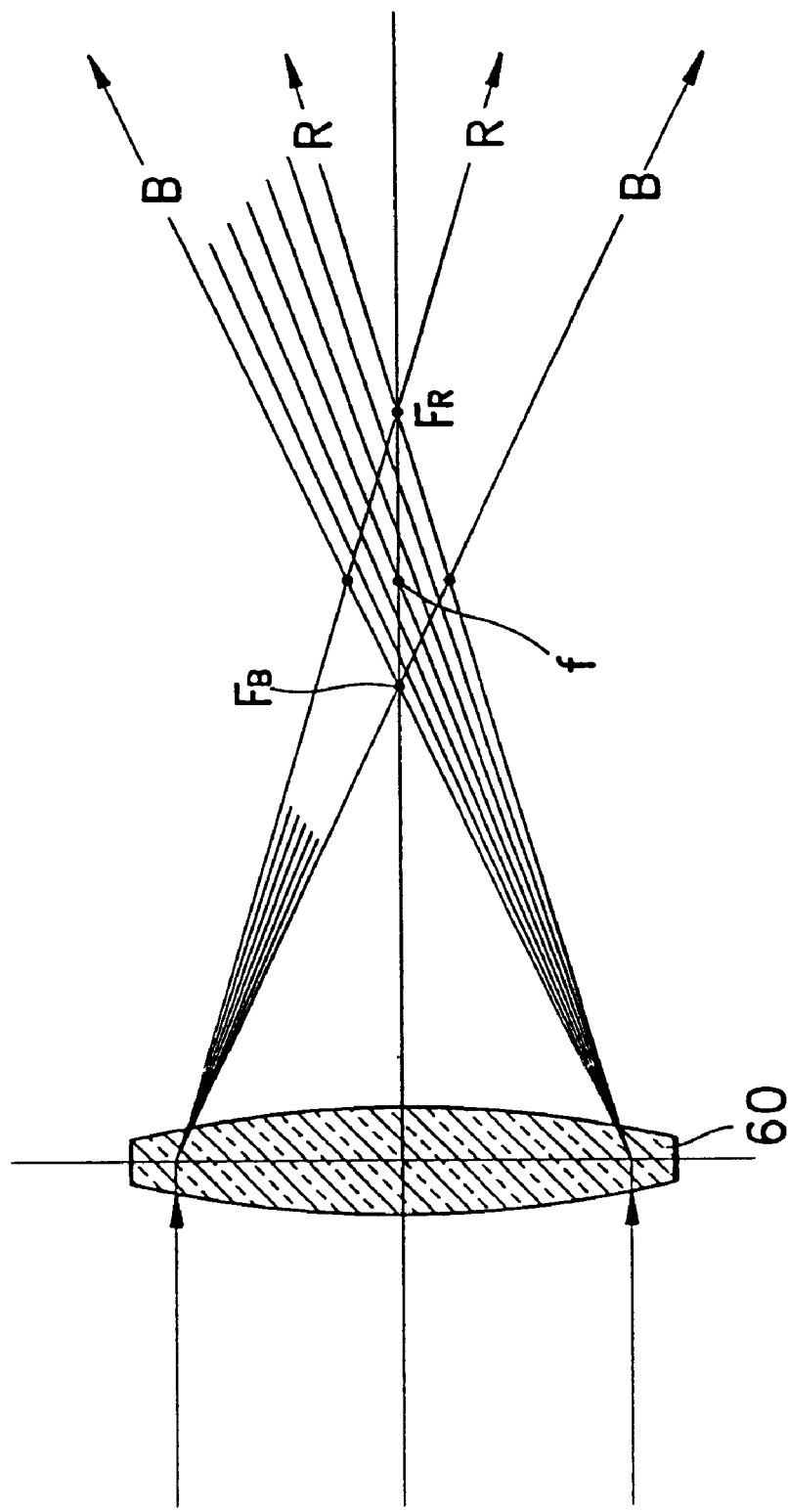
FIG. 2 is a schematic view for explaining chromatism due to a typical convex lens.
Figure 3:
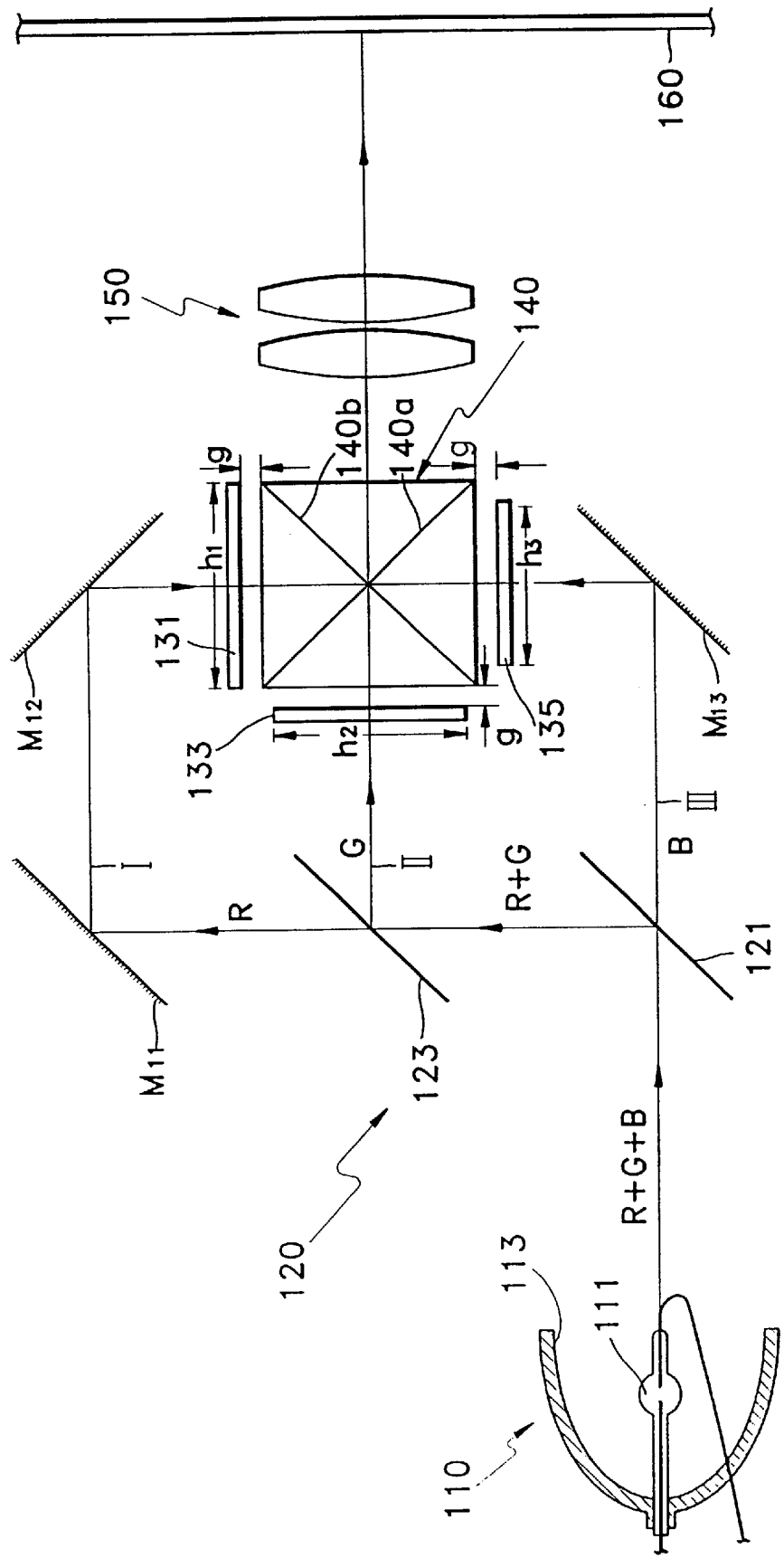
FIG. 3 is a view showing the optical arrangement of a transmission type color projector according to a first preferred embodiment of the present invention.

Referring to FIG. 3, a color projector according to a first preferred embodiment of the present invention includes a light source 110, a splitting device 120 for splitting the light emitted from the light source 110 to proceed along any of three paths according to the wavelength of the light, first through third display devices 131, 133 and 135, arranged on first through third optical paths I, II and III split by the splitting device 120, to form an image, a synthesizing device 140 for synthesizing the respective color lights to allow the synthesized light to proceed along one path by selectively transmitting or reflecting the input light passing through the first through third display devices 131, 133 and 135 according to the wavelength thereof, and a projection lens unit 150 for allowing the color image synthesized by the synthesizing device 140 to proceed toward a screen 160 by magnifying the same.

The light source 110 includes a lamp 111 for generating light and a reflection mirror 113 for reflecting the light emitted from the lamp 111 and guiding a proceeding path of the reflected light. The reflection mirror 113 is an oval mirror having one focal point at the position of the lamp 111 and the other focal point at the position where light is focused, or a parabolic mirror having the focal point at the position of the lamp 111 for making the light reflected by the reflection mirror 113 a parallel beam.

The splitting device 120 is for splitting the light emitted from the light source 110 to proceed along first through third optical paths I, II and III according to red (R), blue (B) and green (G) colors of the light. The splitting device 120 includes first and second dichromatic mirrors 121 and 123 and a plurality of total reflection mirrors M11, M12 and M13 for allowing the light split by the first and second dichromatic mirrors 121 and 123 to proceed along three different paths. The first dichromatic mirror 121 is for primarily splitting the light (R+G+B) emitted from the light source 110 according to the wavelength of the light. That is, of the light input to the first dichromatic mirror 121, the first dichromatic mirror 121 transmits the light having the wavelength of blue (B) color to proceed along the third optical path III, and reflects the remaining light (R+G). Here, the total reflection mirror M13 disposed on the third optical path III reflects the input blue (B) light to proceed toward the third display device 135.

The light (R+G) reflected by the first dichromatic mirror 121 is split again by the second dichromatic mirror 123 according to the wavelength thereof. That is, the second dichromatic mirror 123 transmits the light having the wavelength of red (R) color to proceed along the first optical path I, and reflects the light of a green (G) color to proceed along the second optical path II. Here, the total reflection mirrors M11 and M12 disposed along the first optical path I reflect the input red (R) light to proceed toward the first display device 131. The green (G) light passes along the second optical path 11 and is input to the second display device 133.

The respective first through third display devices 131, 133 and 135 can be configured as a transmission type LCD device, as shown in FIG. 3. As each of the first through third display devices 131, 133 and 135 forms an image with respect to red (R), green (G) and blue (B) colors, chromatism is generated when the images of red (R), green (G) and blue (B) colors are synthesized by the synthesizing device 140 and pass through the projection lens unit 150 along the same optical path. Thus, considering the chromatism generated at the first through third display devices 131, 133 and 135, it is a characteristic feature that two or more display devices selected from the first through third display devices 131, 133 and 135 are different in the size of an effective area for generating an image. In this case, the distance g between each of the first through third display devices 131, 133 and 135 and a light input surface of the synthesizing device 140 is preferably the same.

Figure 4:
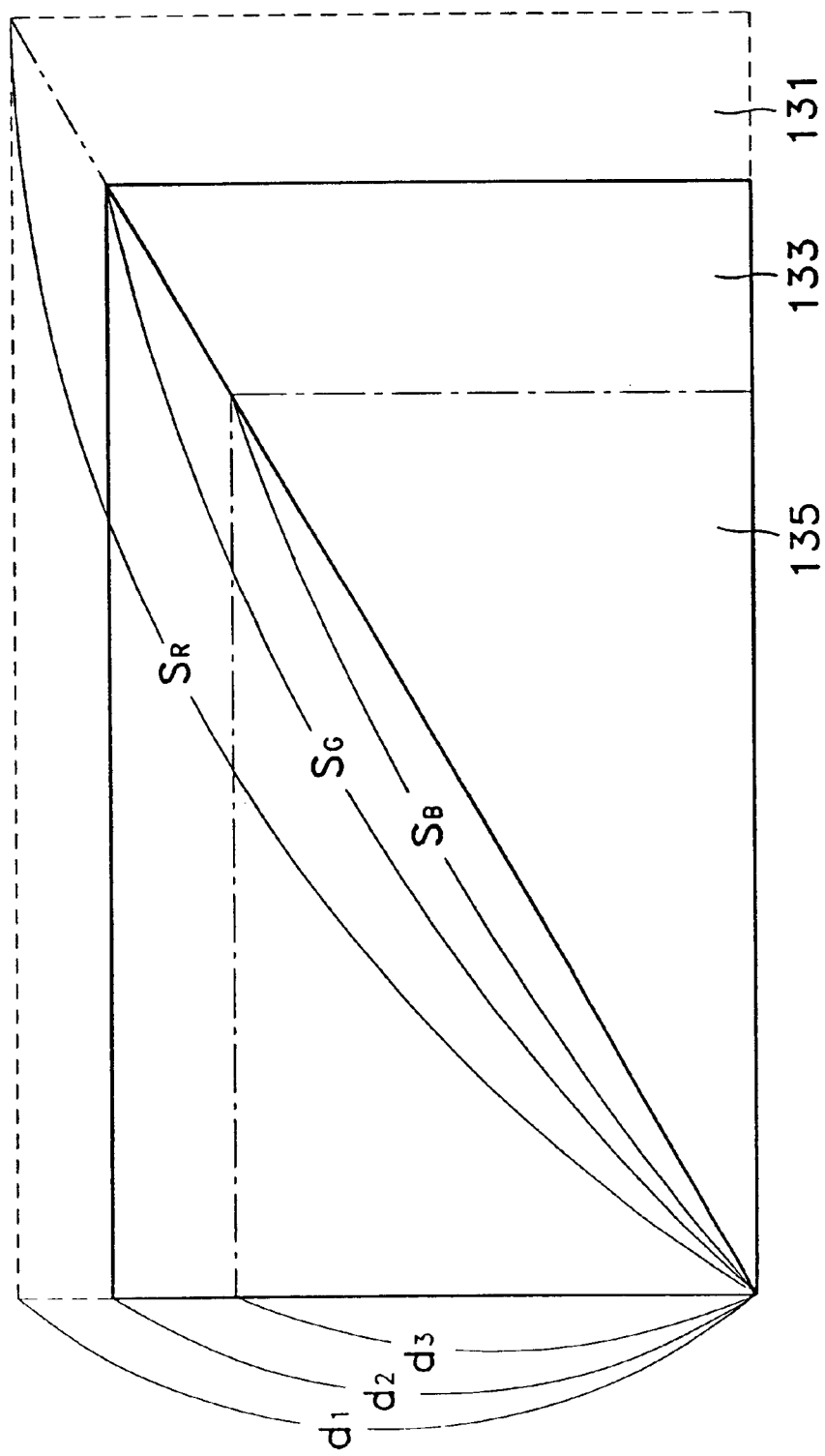
FIG. 4 is a view showing the result of comparison of effective surface sizes of the first through third display devices.

Referring to FIGS. 3 and 4, the first through third display devices 131, 133 and 135 have the same ratio in the size of an effective area, for example, 16:9 and have respective side lengths $d_1$, $d_2$ and $d_3$. Assuming that the lengths of diagonal lines of the effective areas of the first, second and third display devices 131, 133 and 135 are $S_R$, $S_G$ and $S_B$, respectively, the lengths of the diagonal lines $S_R$, $S_G$ and $S_B$, satisfy the following Inequality 1.

$$S_B<S_G<S_R \quad \text{[Inequality 1]}$$

When the sizes of the effective areas of the first through third display devices 131, 133 and 135 are set to be different from one another as indicated by Inequality 1, the relation of correction of chromatism is described with reference to FIG. 5.

FIG. 5 is a view showing the first through third display devices 131, 133 and 135 by overlapping those in a state in which the synthesizing device 140 of FIG. 3 is excluded to explain a case in which the first through third display devices 131, 133 and 135 are separated the same optical distance away from the screen 160. Also, FIG. 5 schematically shows the projection lens unit 150 of FIG. 3.

Referring to FIG. 5, the light input to the projection lens unit 150 is refracted at different refraction angles at the projection lens unit 150 according to wavelength. When the sizes of effective areas of the first through third display devices 131, 133 and 135 are set to be different from one another considering the different refraction angles, the size of an image with respect to each color, focused and diverged by the projection lens unit 150 and image-forming on the screen 160, can be matched. Thus, even when the projection lens unit 150 is designed without considering chromatism, the difference in magnification with respect to red, green and blue colors at the screen 160 is barely generated so that deterioration of image quality due to chromatism can be prevented.

Figure 6A:
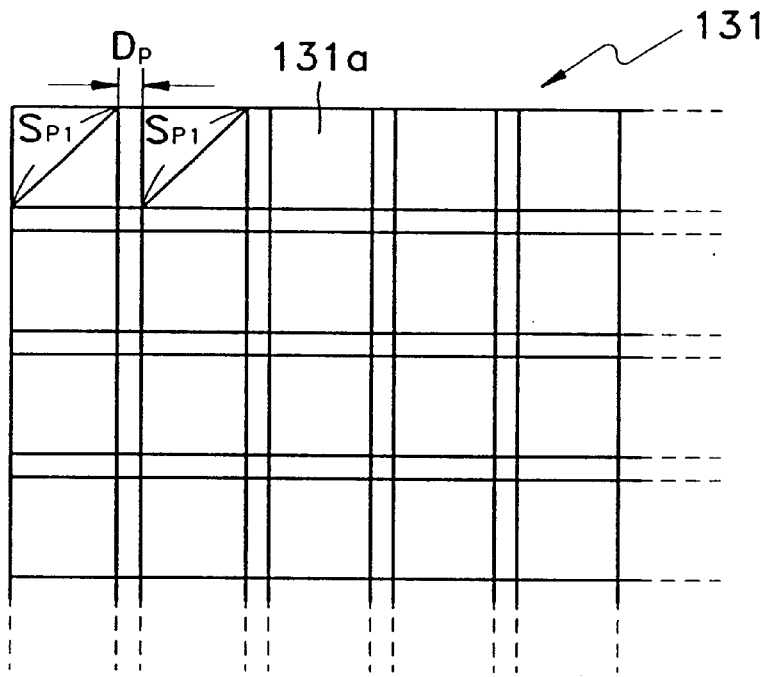
FIGS. 6A through 6C are views respectively showing part of pixels forming a display device according to a preferred embodiment in the color projector of FIG. 3.
Figure 6B:
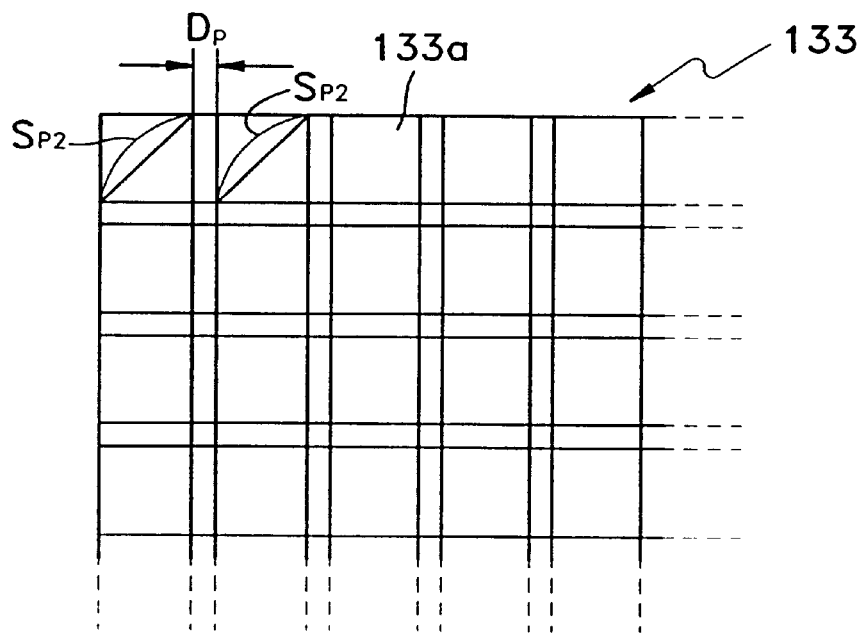
Figure 6C:
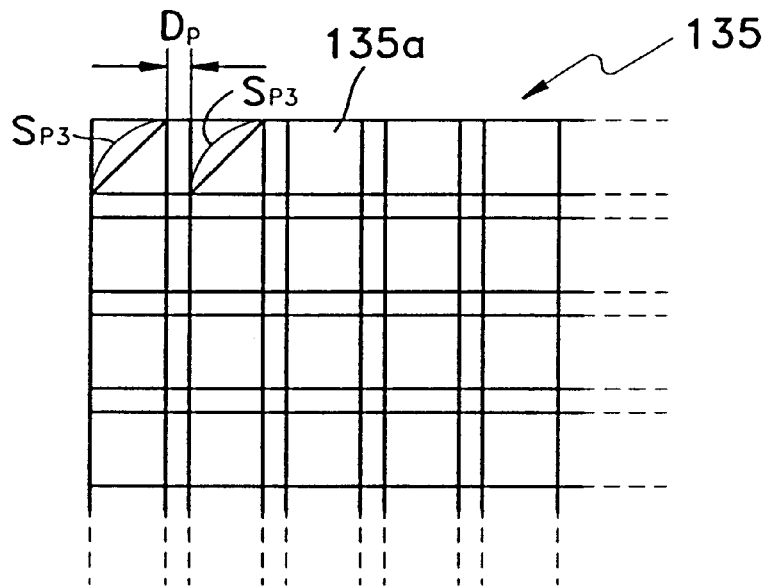

Referring to FIGS. 6A through 6C, each of the first through third display devices 131, 133 and 135 have a planar arrangement and a plurality of pixels 131a, 133a and 135a independently driven according to input video signals. Here, as a preferred embodiment to satisfy the conditions of Inequalities 1 through 3, the pixels 131a, 133a and 135a of the first through third display devices 131, 133 and 135 preferably satisfy the Inequality 2. Also, the distance $D_P$ between each pixel is preferably the same.

That is, as shown in FIG. 6A, assuming that the length of a diagonal line of each of the pixels 131a forming the first display device 131 is $S_{P1}$, the length of a diagonal line of each of the pixels 133a forming the second display device 133 is $S_{P2}$, and the length of a diagonal line of each of the pixels 135a forming the third display device 135 is $S_{P3}$, the lengths of diagonal lines $S_{P1}$, $S_{P2}$ and $S_{P3}$ of the respective pixels 131a, 133a and 135a satisfy the following Inequality 2.

$$S_{P3}<S_{P2}<S_{P1} \quad \text{[Inequality 2]}$$

Figure 7A:
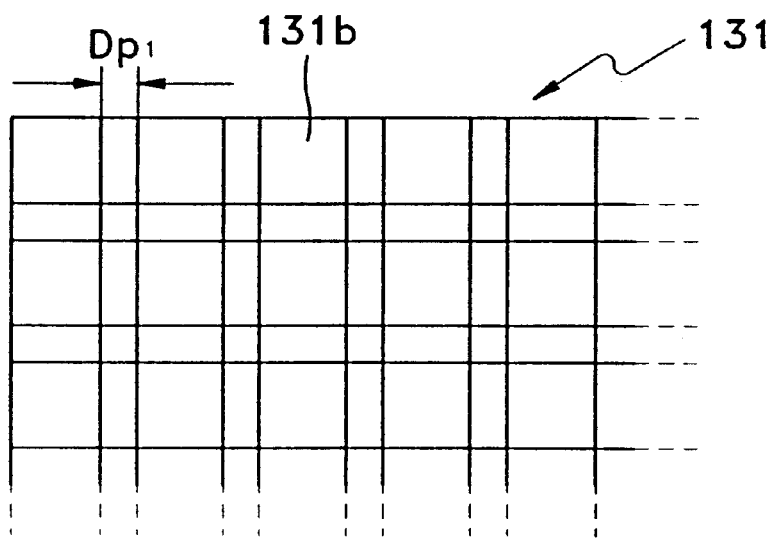
FIGS. 7A through 7C are views respectively showing part of pixels forming a display device according to another preferred embodiment of the color projector of FIG. 3.
Figure 7B:
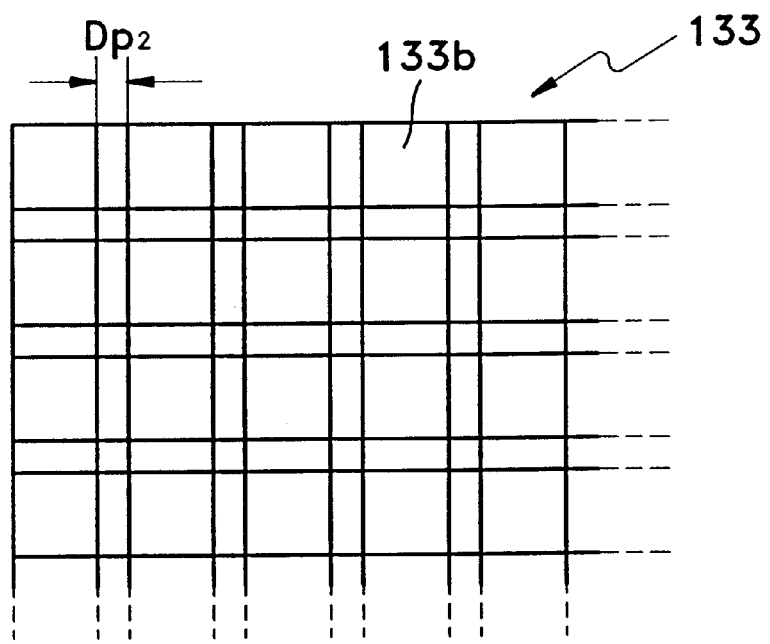
Figure 7C:
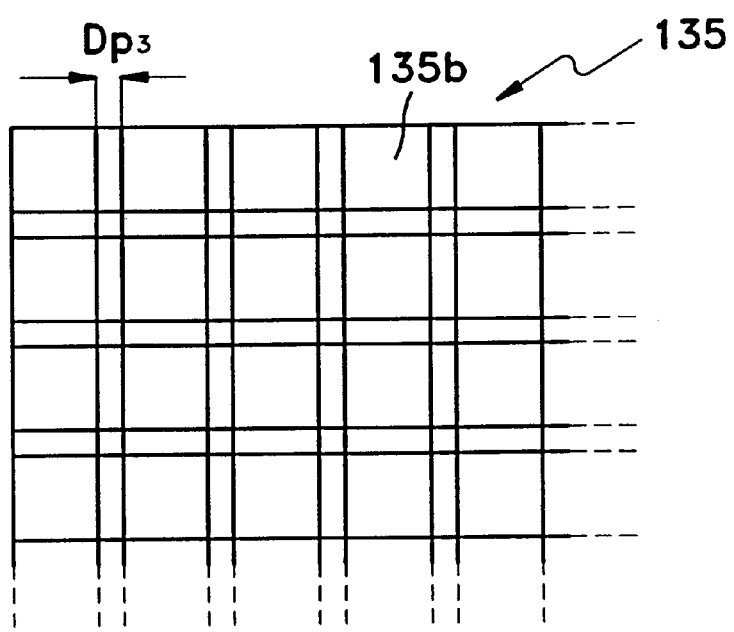

Also, in another preferred embodiment of the first through third display devices satisfying the conditions of Inequality 1, as shown in FIGS. 7A through 7C, each of the first through third display devices 131, 133 and 135 has a planar arrangement and includes a plurality of pixels 131b, 133b and 135b independently driven according to input video signals. Here, each of the pixels 131 b, 133b and 135b has the same size.

Assuming that the distance between the pixels 131b of the first display device 131 is $D_{P1}$, as shown in FIG. 7A, the distance between the pixels 133b of the second display device 133 is $DP_2$, as shown in FIG. 7B, and the distance between the pixels 135b of the third display device 135 is $DP_3$, as shown in FIG. 7C, the distances between the pixels, $D_{P1}$, $D_{P2}$ and $D_{P3}$, satisfy the following Inequality 3.

$$D_{P3}<D_{P2}<D_{P1} \quad \text{[Inequality 3]}$$

Referring back to FIG. 3, the synthesizing device 140 has three incident surfaces arranged to face the respective first through third display devices 131, 133 and 135, one exhaust surface arranged to face the projection lens unit 150, and first and second mirror surfaces 140a and 140b for selectively transmitting or reflecting the red, green and blue lights input along the first through third optical paths I, II and III. The first mirror surface 140a reflects the input red (R) light and transmits the green (g) and blue (B) lights. The second mirror surface 140b reflects the input blue (B) light toward the exhaust surface and transmits the red (R) and the green (G) lights. Thus, the light input to three incident surfaces along different paths is selectively transmitted or reflected at the first and second mirror surfaces 140a and 140b to proceed toward the screen 160 along the same path through the exhaust surface.

The projection lens unit 150 arranged between the synthesizing device 140 and the screen 160 magnifies and projects the input color image. As the projection lens unit 150 can be designed to adjust a design focus to correct distortion and field curvature of an image formed on the screen 160, a significant part of distortion which is easily discernible by a viewer can be corrected.

Figure 8:
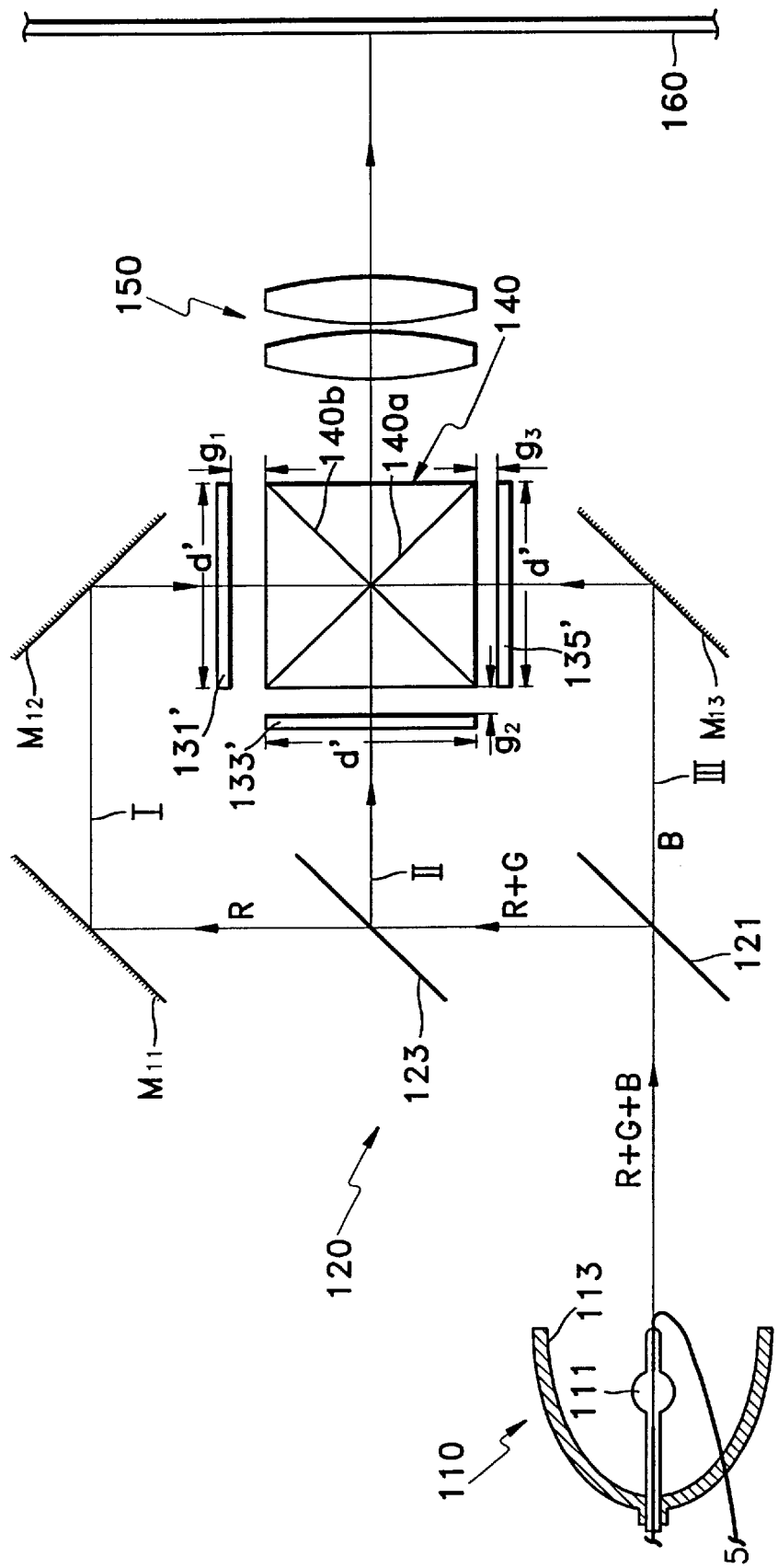
FIG. 8 is a view showing the optical arrangement of a transmission type color projector according to a second preferred embodiment of the present invention.

Referring to FIG. 8, a color projector according to a second preferred embodiment of the present invention includes a light source 110, a splitting device 120, first through third display devices 131', 133' and 135' arranged along first through third display devices I, II and III for forming an image, a synthesizing device 140 for synthesizing the input light passing through the first through third display devices 131', 133' and 135', and a projection lens unit 150. Here, as the elements using the same reference numerals as those shown in FIG. 3 have substantially the same functions as those of the color projector according to the first preferred embodiment of the present invention, a detailed description thereof will be omitted.

The color projector according to the present embodiment is a device for correcting chromatism and has a characteristic feature in that the distances between two or more display devices selected from the first through third display devices 131', 133' and 135' and the projection lens unit 150 are set to be different from each other.

Each of the first through third display devices 131', 133' and 135' has a planar arrangement and includes a transmission type LCD panel having a plurality of pixels independently driven according to the input video signals. Preferably, the length of the width in one direction is d' such that the sizes of effective areas in image forming areas of the respective first through third display devices 131',133' and 135' are the same.

When the distance on the optical axis between the three incident surfaces of the synthesizing device 140 and the projection lens unit 150, assuming that the distances between the first through third display devices 131', 133' and 135' and the synthesizing devices 140 are $g_1$, $g_2$ and $g_3$, the distances therebetween are preferably set to be different from each other within a range of satisfying the conditions of Inequality 4.

$$g_3<g_2<g_1 \quad \text{[Inequality 4]}$$

Figure 9:
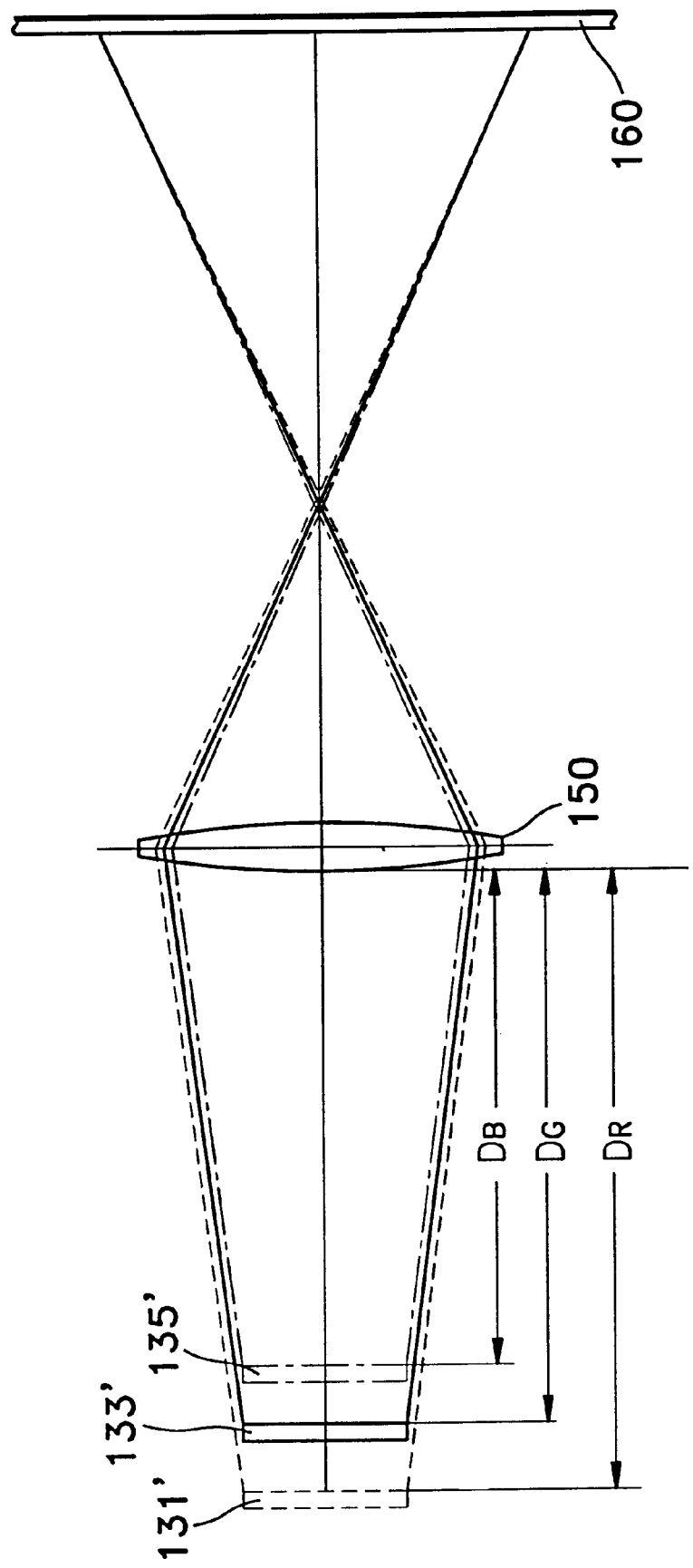
FIG. 9 is a view showing the first through third display devices, being superposed in one direction, in a state in which a synthesizing device of FIG. 8 is excluded from the color projector of FIG. 8.

FIG. 9 is for explaining a case in which the first through third display devices 131',133' and 135' are of the same size and have different optical distances from the screen 160, in which the first through third display devices 131', 133' and 135' are arranged in one direction in a state in which the synthesizing device 140 is excluded. Also, the projection lens unit 150 is shown in FIG. 9 in a simplified state.

Referring to FIG. 9, the light input to the projection lens unit 150 is refracted at different refraction angles at the projection lens unit 150 according to wavelength. When the distances between each of the first through third display devices 131', 133' and 135' and the incident surface of the projection lens unit 150 are $D_R$, $D_G$ and $D_B$, respectively, by setting the distances considering the different refraction angles, the size of an image with respect to each color, focused and diverged by the projection lens unit 150 and image-forming on the screen 160, can be matched.

Thus, even when the projection lens unit 150 is designed without considering chromatism, the difference in magnification with respect to red, green and blue colors at the screen 160 is hardly generated so that deterioration of image quality due to chromatism can be prevented. Here, as the focal point of the light of a red wavelength is formed far with respect to the effective focal position of the projection lens unit and the focal point of the light of a blue wavelength is formed near to the effective focal position of the projection lens unit, the distances $D_R$, $D_G$ and $D_B$ satisfy Inequality 5.

$$D_B < D_G < D_R \quad \text{[Inequality 5]}$$

Figure 10:
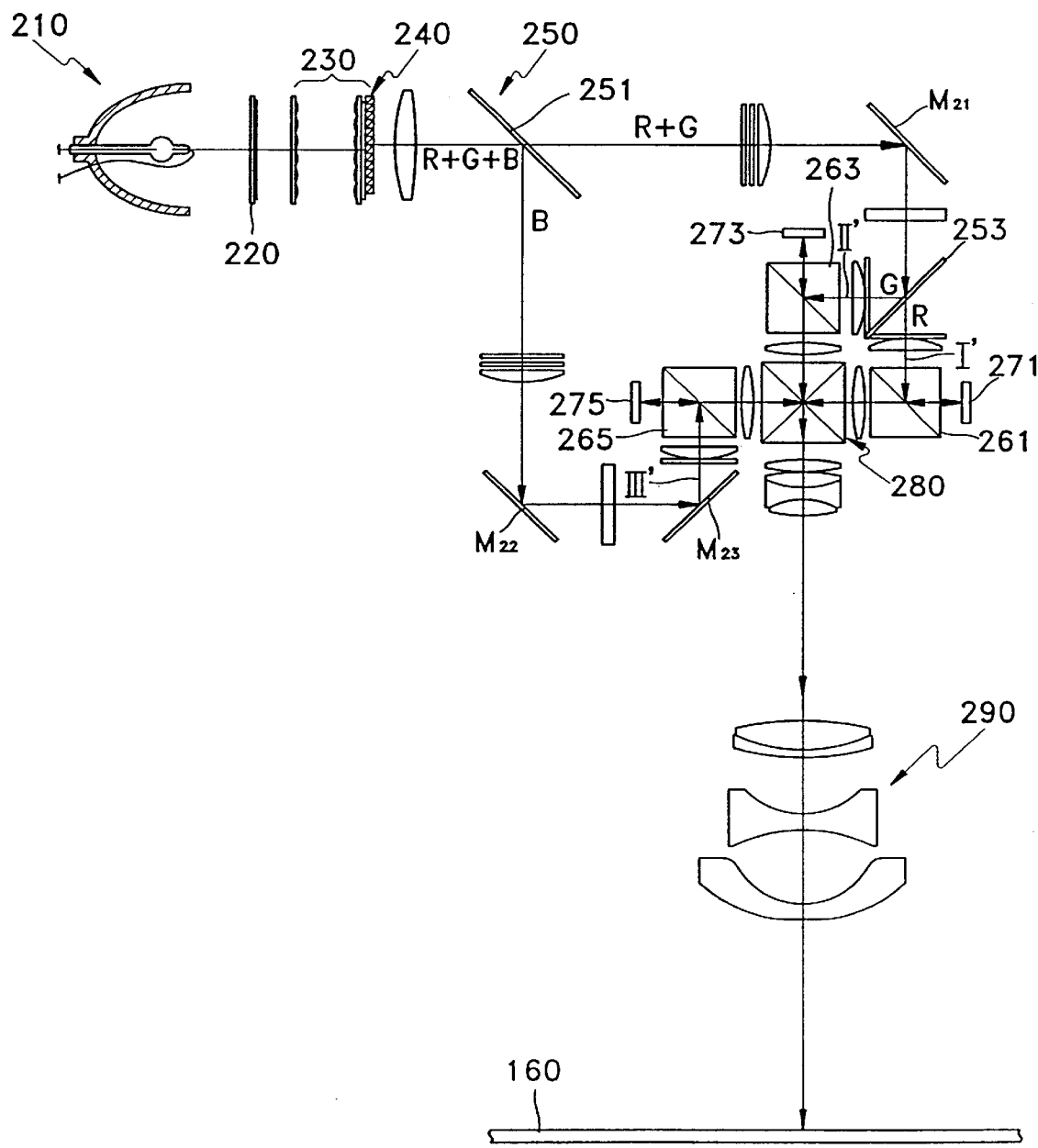
FIG. 10 is a view showing the optical arrangement of a transmission type color projector according to a third preferred embodiment of the present invention.

Referring to FIG. 10, a reflection type color projector according to a third preferred embodiment of the present invention include a light source 210, a splitting device 250 for splitting an input light according to the wavelength of the input light to proceed along each of the first through third optical paths I', II' and III', first through third optical path changing devices 261, 263 and 265 for changing the proceeding path of the split light according to the direction of polarization, first through third display devices 271, 273 and 275 for generating images from an input light of one polarization passing through the first through third optical path changing devices 261, 263 and 265 and reflecting the generated images toward the first through third optical path changing devices 261, 263 and 265, a synthesizing device 280 for synthesizing the input light after being reflected by the first through third display devices 271, 273 and 275, and a projection lens unit 290 for magnifying and projecting the color image synthesized by the synthesizing device 280 to be formed on the screen 160.

Also, the color projector according to the present embodiment preferably further comprises a bandpass filter 220 for blocking the light in the infrared and ultraviolet ranges of the light emitted from the light source 210, a uniform light illumination device 230 for making the input light a parallel beam, and a polarization converter 240 for converting the light emitted from the light source 210 to a light of one polarization, as shown in FIG. 10.

Here, as the light source 210, the synthesizing device 280, and the projection lens unit 290 are substantially the same elements having the same functions as the light source 110, the synthesizing device 140 and the projection lens unit 150 of the color projector according to the first preferred embodiment of the present invention described with reference to FIG. 3, a detailed description thereof will be omitted.

The splitting device 250 is for splitting the light emitted from the light source 210 to proceed along the first through third optical paths I', II'0 and II' according to the red (R), blue (B) and green (G) colors. The splitting device 250 includes first and second dichromatic mirrors 251 and 253, and a plurality of total reflection mirrors $M_{21}$, $M_{22}$ and $M_{23}$ for allowing the lights split by the first and second dichromatic mirrors 251 and 253 to proceed along three different paths. The first dichromatic mirror 251 is for primarily splitting the light (R+G+B) emitted from the light source 110 according to the wavelength of the light. Of the input light to the first dichromatic mirror 251, the light (B) of a blue wavelength is reflected by the first dichromatic mirror 251 and proceed along the third optical path III', and the remaining lights (R+G) pass through the first dichromatic mirror 251 thereby. Here, the total reflection mirrors $M_{22}$ and $M_{23}$ are arranged on the third optical path III' and make the input blue light (B) to proceed toward the third optical path changing device 265.

The light (R+G) passes through the first dichromatic mirror 251 is reflected by the total reflection mirror $M_{21}$ and split by the second dichromatic mirror 253 according to the wavelength thereof. That is, the second dichromatic mirror 253 transmits the light of a red (R) wavelength to proceed along the first optical path I' and reflects the light of a green (G) wavelength to proceed along the second optical path II'. Here, the red (R) light is input to the first optical path changing device 261 along the first optical path I' and the green (G) light is input to the second optical path changing device 263 along the second optical path II'.

Each of the first through third display devices 271, 273 and 275 is comprised of a reflection type LCD device and a digital micro mirror device. When the reflection type LCD device is adopted, it is preferable to adopt a ferroelectric liquid crystal display (FLCD) device exhibiting a rapid response speed according to turning on/off of driving power, as the LCD device. The digital micro mirror device corresponding to each pixel forms an image by determining the reflection path of input light by driving a plurality of reflection mirrors independently driven by applied electrostatic attraction. As the configuration of the digital micro mirror device is well known, a detailed description thereof will be omitted.

As each of the reflection type first through third display devices 271, 273 and 275 forms an image with respect to the red (R), green (G) and blue (B) colors, chromatism is generated when the light passes through the projection lens unit 290. Thus, the reflection type first through third display devices 271, 273 and 275, considering chromatism generated at the projection lens unit 290, have the characteristic feature in that the sizes of the effective areas for generating images of two or more display devices selected from the first through third display devices 271, 273 and 275 are different from each other. Here, each of the first through third display devices 271, 273 and 275 has the same aspect ratio such as 16:9.

When the diagonal lines of an effective area of the first through third display devices 271, 273 and 275 are assumed to be $S'_R$, $S'_G$ and $S'_B$, respectively, the lengths of diagonal lines $S'_R$, $S'_G$ and $S'_B$ satisfy the following Inequality 6.

$$S'_B < S'_G < S'_R \quad \text{[Inequality 6]}$$

Even when the lens of the projection lens unit 290 is designed without considering chromatism, as shown in FIG. 3, the difference in magnification with respect to red, green and blue colors is barely generated at screen 160. Thus, when the size and interval of pixels of each display device is designed to satisfy the relationship of Inequality 6, deterioration of image quality due to chromatism can be reduced.

Preferably, the first through third optical path changing devices 261, 263 and 265 are polarization beam splitters for changing the optical path by selectively transmitting or reflecting the input light according to the polarization. Here, the polarization beam splitter has a cubic or sheet structure, as shown in FIG. 10.

As a color projector according to a fourth preferred embodiment of the present invention has the same optical structure as the color projector of the third preferred embodiment of the present invention described with reference to FIG. 10, a drawing therefor will be omitted. However, the color projector of the fourth preferred embodiment has the characteristic feature in that the sizes of the reflection type first through third display devices 271, 273 and 275 are the same and the distance on the optical axis between each of the first through third display devices 271, 273 and 275 and the screen 160 are set to be different, so that chromatism can be corrected. That is, assuming that the distances between each of the first through third display devices 271, 273 and 275 and the first incident surface of the projection lens unit 290 are $D'_R$, $D'_G$ and $D'_B$, by setting the distances therebetween considering the effect by chromatism, the size of image with respect to each color formed at the screen 160 after being focused and diverged by the projection lens unit 290 can be matched.

Thus, even when the lens of the projection lens unit 290 is designed without considering chromatism, the difference in magnification with respect to red, green and blue colors is barely generated at the screen 160. Therefore, deterioration of image quality due to chromatism can be prevented. Here, as the focal point of the light of a red wavelength is formed far with respect to the effective focal position of the projection lens unit and the focal point of the light of a blue wavelength is formed near the effective focal position of the projection lens unit, the distances $D'_R$, $D'_G$ and $D'_B$ satisfy Inequality 7.

$$D'_B < D'_G < D'_R \qquad \text{[Inequality 7]}$$

As described above, in the color projector according to the present invention, even when chromatism generated while the lights of red, blue and green wavelengths pass through the projection lens unit, the generation of the difference in magnification with respect to red, green and blue colors is reduced by adjusting the size of and/or interval between the display devices, so that convergence is matched. Thus, deterioration of image quality can be prevented.

Also, as the number of lenses needed for correcting chromatism can be reduced during design of the projection lens unit, the design of an optical system is facilitated to correct distortion and field curvature.

What is claimed is:

1. A color projector comprising:
    a light source which emits a light;
    a splitting device for splitting the light emitted from the light source to proceed along first through third optical paths according to a predetermined wavelength thereof;
    first through third display devices, arranged on the first through third optical paths, for forming an image from light of the predetermined wavelength;
    a synthesizing means for synthesizing lights of different colors to proceed along one path by selectively transmitting or reflecting input lights passing through the first through third display devices according to the predetermined wavelength thereof; and
    a projection lens unit for magnifying and projecting a color image synthesized by the synthesizing means toward a screen,
    wherein two or more display devices selected from the first through third display devices have different sizes of effective areas where an image is formed such that chromatism generated while lights of different colors synthesized by the synthesizing means pass the projection lens unit is corrected.

2. The color projector as claimed in claim 1, wherein the splitting device splits an input light into lights of red, green and blue wavelengths so that the lights of red, green and blue wavelengths can proceed along the first, second and third optical paths, respectively, and each of the first through third display devices forms an image with respect to the lights of red, green and blue wavelengths,
    wherein the effective area of each of the first through third display devices has the same aspect ratio, and the lengths of diagonal lines of the effective areas are $S_R$, $S_G$ and $S_B$, such that the lengths of the diagonal lines $S_R$, $S_G$ and $S_B$ satisfy the following Inequality:

$$S_B < S_G < S_R.$$

3. The color projector as claimed in claim 2, wherein each of the first through third display devices has a planar arrangement and comprises a plurality of pixels independently driven according to input video signals.

4. The color projector as claimed in claim 3, wherein, when the length of a diagonal line of each of the pixels forming the first display device is $S_{P1}$, the length of a diagonal line of each of the pixels forming the second display device is $S_{P2}$, and the length of a diagonal line of each of the pixels forming the third display device is $S_{P3}$, the lengths of the diagonal lines $S_{P1}$, $S_{P2}$ and $S_{P3}$ of the respective pixels satisfy the Inequality:

$$S_{P3} < S_{P2} < S_{P1}.$$

5. The color projector as claimed in claim 3, wherein each of the pixels forming the first through third display devices has the same size, and when the distance between the pixels forming the first display device is $D_{P1}$, the distance between the pixels forming the second display device is $D_{P2}$, and the distance between the pixels of the third display device is $D_{P3}$, the such that distance between the pixels, $D_{P1}$, $D_{P2}$ and $D_{P3}$, satisfy the following Inequality:

$$D_{P3} < D_{P2} < D_{P1}.$$

6. The color projector as claimed in claim 4, wherein,
    a distance between each of the pixels forming the first display device is $S_{p1}$ is the same,
    a distance between each of the pixels forming the second display device is $S_{p2}$ is the same, and
    a distance between each of the pixels forming the third display device is $S_{p3}$ is the same.

7. The color projector as claimed in claim 1, wherein the splitting device comprises a first dichromatic mirror for splitting the light emitted from the light source according to the wavelength ranges thereof, and a second dichromatic mirror for splitting the light split by the first dichromatic mirror again according to the wavelength ranges thereof, so that an input light can be split into lights of red, blue and green colors.

8. The color projector as claimed in claim 1, wherein each of the first through third display devices is a transmission LCD panel.

9. The color projector as claimed in claim 1, wherein each of the first through third display devices is a reflection LCD panel, and further comprising first through third optical path changing devices, arranged on each optical path between the first through third display devices and the synthesizing means, for changing the optical paths so that the lights input along the first through third optical paths can proceed toward the respective first through third display devices, and the lights reflected by the first through third display devices can proceed toward the synthesizing means.

10. The color projector as claimed in claim 9 wherein the first through third optical path changing devices each are polarization beam splitters for changing optical paths by selectively transmitting or reflecting an input light according to the polarization thereof.

11. A color projector comprising:

a light source which emits a light;

a splitting device for splitting the light emitted from the light source to proceed along first through third optical paths according to a predetermined wavelength thereof;

first through third display devices, arranged on the first through third optical paths, for forming an image from an input light of the predetermined wavelength;

a synthesizing means for synthesizing lights of different colors to proceed along one path by selectively transmitting or reflecting input lights passing through the first through third display devices according to the predetermined wavelength thereof; and a projection lens unit for magnifying and projecting a color image synthesized by the synthesizing means toward a screen, wherein distances between two or more display devices selected from the first through third display devices and the projection lens unit are different from one another such that chromatism generated while lights of different colors synthesized by the synthesizing means pass the projection lens unit is corrected.

12. The color projector as claimed in claim 11, wherein the splitting device splits an input light into lights of red, green and blue wavelengths so that the lights of red, green and blue wavelengths can proceed along the first, second and third optical paths, respectively, and each of the first through third display devices forms an image with respect to the lights of red, green and blue wavelengths, wherein the distances between each of the first through third display devices and a lens closer to the synthesizing means of lenses constituting the projection lens unit are $D_R$, $D_G$ and $D_B$, and the distances $D_R$, $D_G$ and $D_B$ satisfy the following Inequality:

$$D_B < D_G < D_R.$$

13. The color projector as claimed in claim 11, wherein the sizes of the effective areas of the first through third display devices, where images are formed, are the same.

14. The color projector as claimed in claim 11, wherein the splitting device comprises a first dichromatic mirror for splitting the light emitted from the light source according to the wavelength ranges thereof, and a second dichromatic mirror for splitting the light split by the first dichromatic mirror again according to the wavelength ranges thereof, so that an input light can be split into lights of red, blue and green colors.

15. The color projector as claimed in claim 11, wherein each of the first through third display devices is a transmission LCD panel.

16. The color projector as claimed in claim 11, wherein each of the first through third display devices is a reflection LCD panel, and further comprising first through third optical path changing devices, arranged on each optical path between the first through third display devices and the synthesizing means, for changing the optical paths so that the lights input along the first through third optical paths can proceed toward the respective first through third display devices, and the lights reflected by the first through third display devices can proceed toward the synthesizing means.

17. The color projector as claimed in claim 16, wherein each of the first through third optical path changing devices is a polarization beam splitter for changing optical paths by selectively transmitting or reflecting an input light according to the polarization thereof.

18. The color projector as claimed in claim 17, wherein the polarized beam splitter has a cubic structure.

19. The color projector as claimed in claim 18, further comprising:

a bandpass filter for blocking the light in the infrared and ultraviolet ranges of the light source; and a uniform light illumination device for making the input light a parallel beam.

20. The color projector as claimed in claim 19, wherein each of said first through third display devices is comprised of a reflection LCD device and a digital micro mirror device.

21. The color projector as claimed in claim 20, wherein each of said reflection LCD devices is a ferroelectric liquid crystal display device.

22. The color projector as claimed in claim 21, wherein the sizes of two or more of the display devices, selected from the first through third display devices, are different from each other.

23. The color projector as claimed in claim 21, wherein the sizes of the first through third display devices are the same; and the distance on the optical axis between each of the first through third display devices and the screen are different.

24. A color projector comprising:

a light source for emitting a light;

means for splitting the light emitted from the light source to proceed along first through third optical paths according to a predetermined wavelength thereof;

first through third display devices, arranged on the first through third optical paths, for forming an image from an input light of the predetermined wavelength;

means for synthesizing lights of different colors to proceed along one path by selectively transmitting or reflecting input lights passing through the first through third display devices according to the predetermined wavelength thereof; and a projection lens unit for magnifying and projecting a color image synthesized by the synthesizing means toward a screen, wherein two or more display devices selected from the first through third display devices have different sizes of effective areas where an image is formed such that chromatism generated while lights of different colors synthesized by the synthesizing means pass the projection lens unit is corrected.

25. A color projector comprising:

a light source which emits a light;

a splitting device which splits the light emitted from the light source to proceed along first through third optical paths according to a predetermined wavelength thereof;

first through third display devices, arranged on the first through third optical paths, which form an image from an input light of the predetermined wavelength;

a synthesizer, wherein said synthesizer allows lights of different colors to proceed along one path by selectively transmitting or reflecting input lights passing through the first through third display devices according to the predetermined wavelength thereof; and a projection lens unit which magnifies and projects a color image synthesized by the synthesizer toward a screen, wherein two or more display devices selected from the first through third display devices have different sizes of effective areas where an image is formed such that chromatism generated while lights of different colors synthesized by the synthesizer pass the projection lens unit is corrected.

26. A color projector comprising:

a light source which emits light;

means for splitting the light emitted from the light source to proceed along first through third optical paths according to a predetermined wavelength thereof;

first through third display devices, arranged on the first through third optical paths, for forming an image from an input light of the predetermined wavelength;

means for synthesizing lights of different colors to proceed along one path by selectively transmitting or reflecting input lights passing through the first through third display devices according to the predetermined wavelength thereof; and a projection lens unit for magnifying and projecting a color image synthesized by the synthesizing means toward a screen, wherein distances between two or more display devices selected from the first through third display devices and the projection lens unit are different from one another such that chromatism generated while lights of different colors synthesized by the synthesizing means pass the projection lens unit is corrected.

27. The color projector according to claim 26, wherein distances between two or more display devices selected from the first through third display devices and the means for synthesizing lights of different colors are different from one another so that the chromatism generated is corrected.

28. A color projector comprising:

a light source which emits a light;

a splitting device which splits the light emitted from the light source to proceed along first through third optical paths according to a predetermined wavelength thereof;

first through third display devices, arranged on the first through third optical paths, which form an image from an input light of the predetermined wavelength;

a synthesizer, wherein said synthesizer allows lights of different colors to proceed along one path by selectively transmitting or reflecting input lights passing through the first through third display devices according to the predetermined wavelength thereof; and a projection lens unit which magnifies and projects a color image synthesized by the synthesizer toward a screen, wherein distances between two or more display devices selected from the first through third display devices and the projection lens unit are different from one another such that chromatism generated while lights of different colors synthesized by the synthesizer pass the projection lens unit is corrected.

29. The color projector according to claim 28, wherein distances between two or more display devices selected from the first through third display devices and the synthesizer are different from one another so that the chromatism generated is corrected.

\* \* \* \* \*